United States Patent Office 3,042,647
Patented July 3, 1962

3,042,647
COMPOSITION CONSISTING OF POLYPYRROLI-
DONE AND A CHLORINATED PHENOL AND
PROCESS FOR PREPARING SAME
William B. Black, Decatur, Ala., assignor, by mesne assignments, to Monsanto Chemical Company, a corporation of Delaware
No Drawing. Filed Apr. 9, 1959, Ser. No. 805,120
17 Claims. (Cl. 260—33.4)

This invention relates to new compositions of matter. More particularly, the invention relates to new compositions of matter comprising polypyrrolidone and solvents therefor.

Polypyrrolidone possesses many excellent properties which make it desirable for utilization in the manufacture of end products, such as ribbons, films, fibers, filaments, rods, bristles, lacquers, coatings, shaped articles and the like. Polypyrrolidone can be converted into shaped articles in many ways. For example, it may be cast into films or forced through multi-hole spinnerets to form fibers or filaments. Regardless of the end use to which the polypyrrolidone is to be put, it is generally more convenient and efficient to employ the polymer in a solution. This is well illustrated in textile industry where polypyrrolidone is employed in the formation of fibers and filaments, which are manufactured by several methods of spinning, such as melt-spinning, dry-spinning, and wet-spinning.

In the melt-spinning method, the polymer is heated to a high temperature until it becomes molten, and is thereafter forced through sand packs and the like, and thence through a spinneret from whence it is extruded in filamentary form. This method has, however, many disadvantages, although it is widely used in the industry at the present time in the production of synthetic fibers and filaments. The high temperatures used in melt-spinning require the exercise of extreme care in order to prevent the decomposition of the polymer. Furthermore, the high temperatures also affect the chemical and physical characteristics of the polymer and thereby result in a product of inferior quality. In addition to these disadvantages, it is extremely difficult to add to the molten polymer at such high temperatures compounds such as dyes, anti-static agents, plasticizers and the like.

In the dry-spinning method of fiber formation, the polymer is dissolved in a suitable solvent and subsequently extruded from spinneret into a heated atmosphere in order to evaporate the polymer. Even this method, however, has its disadvantages, since during the period of time in which the solvent evaporates, considerable damage may be inflicted on the fibers because of the high heat necessary to bring about solvent evaporation. Another disadvantage of the dry-spinning method, and of the melt-spinning method also, is the added cost necessary to maintain such high temperatures needed to manufacture the desired end product.

The wet-spinning method obviates many of the disadvantages of both melt-spinning and dry-spinning. In order to form filaments by the wet-spinning method, the polymer is dissolved in a suitable solvent and extruded from a spinneret into a coagulating bath capable of leaching the solvent from the fibers. Normally, this method may be carried out at temperatures much lower than either the melt-spinning or dry-spinning methods. If it is desired to use additives, such as dyes, anti-static agents, fire-retarding agents, plasticizers and the like, in the polymeric solution, they may be incorporated therein without the danger of decomposition or seriously affecting the properties of the end product where the wet-spinning method of filamentary formation is employed. It is much easier to introduce such additives into a solution than to introduce them into a molten composition. Then again, solutions are much easier to handle during processing, and in many cases may be stored for long periods of time without a change of physical and chemical properties. It is much easier to cast a film from a solution than to cast it from a molten composition. It is readily apparent, therefore, that solutions of polypyrrolidone possess many distinct advantages over molten compositions in the manufacture of end products.

Accordingly, it is a primary object of the present invention to provide new and useful compositions of matter comprising polypyrrolidone. It is another object of this invention to provide solutions of polypyrrolidone. It is a further object of the invention to provide solutions of polypyrrolidone which may be converted into shaped articles, such as ribbons, films, filaments, fibers, rods, bristles and the like. It is still another object of the invention to provide a process for the preparation of polypyrrolidone solutions. Other objects and advantages of the instant invention will be readily apparent from the description thereof which follows hereafter.

In general, the objects of the present invention are accomplished by dissolving polypyrrolidone in a mono-, di- or trichlorinated phenol.

Among the chlorinated phenols which may be employed in the practice of the present invention, there are o-monochlorophenol, m-monochlorophenol, p-monochlorophenol, 2,3-dichlorophenol, 2,4-dichlorophenol, 2,5-dichlorophenol, 2,6-dichlorophenol, 3,4-dichlorophenol, 3,5-dichlorophenol, 2,3,5-trichlorophenol, and other like isomers. A particularly good trichlorinated phenol capable of dissolving polypyrrolidone is 2,4,6-trichlorophenol.

When dissolving polypyrrolidone in the solvents of the present invention, it may be employed in varying concentrations. The concentration of the polymer in the solvent depends upon the nature of the polymer, the solvent employed and the temperature, which in turn affect the viscosity of the solution. Normally, when the solution is to be employed in the manufacture of fibers and filaments, as much as 35 percent of polymer, based on the total weight of the solution, may be dissolved in the chlorinated phenol solvents. While it is preferred to employ 15 to 30 percent, based on the total weight of the solution, of the polymer in the solvent when the solution is to be used for the preparation of fibers and filaments, it is to be understood that as little as 5 percent or less and more than 35 percent of the polypyrrolidone may be dissolved in the solvents of this invention when the solution is to be employed for other purposes, such as a coating or a lacquer and the like, or when lower or higher molecular weight polymers are to be dissolved. The amount of any specific polymer which can be dissolved in the solvents of this invention will be readily evident to those skilled in the art.

The solvents of this invention readily dissolve polypyrrolidone within a wide range of temperature depending upon the nature of the polymer, the concentration thereof in the solvent, and the nature of the solvent itself. Although temperatures within the range of 15° C. to 140° C. are preferred in bringing about solution, temperatures as low as 5° C. and as high as the boiling point of the polymer/solvent mixture may be employed where necessary to bring about the solution. Heating of the polymer/solvent mixture is preferably accomplished on a water, glycerine or oil bath. However, other means may be employed. If desired, agitation or stirring of the mixture may be employed during heating while a solution is being formed at low temperatures, although it is to be understood that it is not always necessary or critical.

If it is desired to produce shaped articles from the polypyrrolidone compositions of the present invention which have a modified appearance and modified properties, various agents to accomplish these effects may be added to the polymer solution prior to fabrication of the articles without having any ill effects thereon. Such agents may be plasticizers, pigments, dyes, anti-static agents, fire-retarding agents, and the like.

Polypyrrolidones soluble in the solvents of this invention may be prepared by various processes. Generally, however, polymeric pyrrolidone is prepared by polymerizing 2-pyrrolidone in the presence of a catalyst or a catalyst and activator at a temperature in a range of —70° C. to 100° C. However, since the polymerization reaction proceeds well in a range of 20° C. to 70° C., these temperatures are preferred in carrying out a polymerization procedure.

In the preparation of polypyrrolidone, a large number of known catalysts are available to catalyze the polymerization. Among such catalysts, there may be named the alkali metals, namely, sodium, potassium and lithium, as well as the hydrides, hydroxides, oxides and salts of the alkali metals, that is, such salts as sodium, lithium and potassium pyrrolidone. Organic metallic compounds, preferably those which are strongly basic, may be used as catalysts, too. Examples of such compounds are lithium, potassium and sodium alkyls and aryls of the alkali metals, such as sodium phenyl. Another suitable catalyst is sodium amide. The alkali hydrides, however, are the preferred catalysts since a distinct advantage is obtained by their use. Sodium hydride, for example, does not react in the polymerization mixture to form water, which, as is well known, has a deleterious effect on pyrrolidone polymerization. Where water-forming catalysts, such as sodium hydroxide, are employed as a catalyst, all water of reaction must be removed from the reaction mixture by vacuum distillation or other means in order for polymerization to proceed at a reasonable rate. Generally, the catalysts may be employed in a range of 0.002 to 0.25 chemical equivalents based upon one mole of monomeric pyrrolidone in carrying out a polymerization reaction.

Although polypyrrolidone having acceptable properties can be prepared by using a catalyst alone, it is preferable to employ an activator in conjunction with any of the catalysts mentioned above, since the polymer prepared in the presence of both a catalyst and activator has greatly improved properties over polypyrrolidone prepared in the presence of a catalyst alone. Among the compounds which may be employed as activators, there may be named the acyl compounds, such as acetyl pyrrolidone, acetyl morpholone, and the like; lactones, such as gamma butyrolactone, and the like; alkyl esters of mono- and dicarboxylic acids, such as ethyl acetate, ethyl oxalate, and the like; the esters of polyhydric alcohols, such as ethylene glycol diacetate, and the like; and nitrogen dioxide and organic nitrites having the general formula:

$$R-O-N=O$$

wherein R is selected from the group consisting of alkyl groups containing 1 to 10 carbon atoms, haloalkyl groups containing 2 to 10 carbon atoms, nitroalkyl groups containing 2 to 10 carbon atoms, aralkyl groups containing 7 to 10 carbon atoms, and alkoxyalkyl groups containing 3 to 12 carbon atoms. Among the nitrites falling into the general formula set out above, there are methyl nitrite, ethyl nitrite, n-propyl nitrite, iso-propyl nitrite, n-butyl nitrite, iso-butyl nitrite, amyl nitrite, iso-amyl nitrite, hexyl nitrite, heptyl nitrite, octyl nitrite, nonyl nitrite, decyl nitrite, and their isomeric forms, and the like; haloalkyl nitrites, such as 2,2,2-trichloroethyl nitrite; the dihaloalkyl nitrites, such as 2,2-dichloroethyl nitrite, 2,2-dichloropropyl nitrite, 2,2-dichlorobutyl nitrite, 2,2-dichloroamyl nitrite, 2,2-dichlorohexyl nitrite, 2,2-dichloroheptyl nitrite, 2,2-dichlorooctyl nitrite, 2,2-dichlorononyl nitrite, 2,2-dichlorodecyl nitrite, and the like monochloroalkyl nitrites, their isomeric forms, and the like; nitroalkyl nitrites, such as 2-nitroethyl nitrite, 2-nitropropyl nitrite, 2-nitrobutyl nitrite, 2-nitroamyl nitrite, 2-nitrohexyl nitrite, 2-nitroheptyl nitrite, 2-nitrooctyl nitrite, 2-nitrononyl nitrite, 2-nitrodecyl nitrite, and their isomeric forms, and the like; aralkyl nitrites, such as benzyl nitrite, 2-methylbenzyl nitrite, 3-methylbenzyl nitrite, 4-methylbenzyl nitrite, 2-ethylbenzyl nitrite, 3-ethylbenzyl nitrite, 4-ethylbenzyl nitrite, 2-propylbenzyl nitrite, 3-propylbenzyl nitrite, 4-propylbenzyl nitrite, 2-methyl-3-ethylbenzyl nitrite, 2-methyl-4-ethylbenzyl nitrite, 2-methyl-5-ethylbenzyl nitrite, 2-methyl-6-ethylbenzyl nitrite, 3-methyl-4-ethylbenzyl nitrite, 3-methyl-5-ethylbenzyl nitrite, 3-methyl-6-ethylbenzyl nitrite, 4-methyl-2-ethylbenzyl nitrite, 4-methyl-3-ethylbenzyl nitrite, 2,3-dimethylbenzyl nitrite, 2,4-dimethylbenzyl nitrite, 2,5-dimethylbenzyl nitrite, 2,6-dimethylbenzyl nitrite, 3,4-dimethylbenzyl nitrite, 3,5-dimethylbenzyl nitrite, and the like; and alkoxyalkyl nitrites, such as 2-methoxyethyl nitrite, 2-ethoxyethyl nitrite, 2-propoxyethyl nitrite, 2-butoxyethyl nitrite, 2-pentoxyethyl nitrite, 2-hexoxyethyl nitrite, 2-heptoxyethyl nitrite, 2-octoxyethyl nitrite, 2-nonoxyethyl nitrite, 2-decoxyethyl nitrite, and their isomeric forms and the like.

Another excellent polymerization activator is carbon disulfide. Silicon halides and organic silicon halides having the general formula:

$$(R)_y-Si-(X)_z$$

wherein R is a saturated or unsaturated aliphatic or aromatic hydrocarbon radical containing 1 to 10 carbon atoms, a saturated or unsaturated aliphatic or aromatic halogenated hydrocarbon radical containing 1 to 18 carbon atoms, and X is a halogen, z is an integer from 1 to 4 inclusive, and y is equal to 4—z, wherein R may be similar or dissimilar radicals, may also be employed to activate polymerization of 2-pyrrolidone. Among the silicon halides and organic silicon halides there may be named tetrachlorosilane, alpha, beta-dichloroethyltrichlorosilane, bis(chloromethyl) methylchlorosilane, butyltrichlorosilane, chloromethylmethyldichlorosilane, dichloromethyldimethylchlorosilane, diethyldichlorosilane, dimethyldichlorosilane, diphenyldichlorosilane, ethyltrichlorosilane, methyltrichlorosilane, phenyltrichlorosilane, propyltrichlorosilane, trimethylchlorosilane, vinyltrichlorosilane, the iodo- and bromo-forms of the above compounds, and many other. The trihalides of phosphorous, aluminum, bismuth and antimony, the tetrahalides of titanium, tin, zirconium and lead, and the pentahalides of antimony and phosphorous are also useful as activators in the polymerization of 2-pyrrolidone. Such compounds include aluminum trichloride, aluminum tribromide, aluminum triiodide, stannic tetrachloride, stannic tetrabromide, lead tetrachloride, zirconium tetrachloride, bismuth trichloride, bismuth tribromide, antimony trichloride, antimony tribromide, antimony triiodide, antimony pentachloride, antimony pentaiodide, antimony pentafluoride, and the like. The phosphorous halides include phosphorous tribromide, phosphorous pentabromide, phosphorous trichloride, phosphorous pentachloride, phosphorous trifluoride, phosphorous pentafluoride, phosphorous triiodide, and the like. Generally, in the preparation of polypyrrolidone wherein both a catalyst and activator are employed to bring about polymerization, the activator is utilized in a range of 0.0001 to 0.075 chemical equivalents of activator, based upon one mole of 2-pyrrolidone.

The polypyrrolidone soluble in the solvents of the invention is prepared by simple polymerization methods. It can be prepared readily by well-known solution, emulsion, suspension or bulk polymerization procedures. The solution and emulsion polymerizations may be either batch, semi-continuous or continuous methods. When solution polymerization is employed, the monomer is dissolved in a solvent such as 1,4-dioxane, the desired catalyst or activator, or both, added to the solution, and the polymerization carried out under the proper conditions. Well-known solution polymerization apparatus is suitable for preparing the polypyrrolidone described herein. Where either emulsion or suspension polymerization techniques are employed to prepare the polymer, the monomer containing the catalyst is dispersed in a non-solvent, such as petroleum ether, and an emulsifying agent, then added to the dispersion. Subsequently, the desired activator is injected into the mixture and the dispersion is polymerized until the reaction is complete. At this time, suitable coagulant is added to the polymerization mixture in order to precipitate the polymer. A suitable emulsifying agent is sodium lauryl sulfate, and the suitable coagulant is phosphorous acid.

Polypyrrolidone prepared in accordance with the procedures set forth hereinabove has a melting point of about 260° C. and a specific viscosity of from about 0.3 to 4.5 or more. It is thus particularly adapted for the manufacture of shaped articles such as filaments, fibers, films, rods, bristles, and the like. Lower molecular weight polymers prepared in the same manner are suitable for the preparation of coatings or lacquers.

The following examples are intended to illustrate the new compositions of this invention more fully but are not intended to limit the scope of the invention, for it is possible to effect many modifications therein. In the examples, all parts and percents are by weight unless otherwise indicated.

*Example I*

To a 50 gram sample of essentially anhydrous pyrrolidone, there was added under a nitrogen atmosphere sodium hydride catalyst in a ratio of 1:100 parts catalyst to monomer by weight. When the evolution of hydrogen gas was completed, there was added 0.448 gram of carbon disulfide activator. The reaction mixture was stirred vigorously and stoppered and permitted to stand at about 25° C. for 4 hours. The reaction mixture was then ground up with water in a Waring Blendor and the polymer filtered. The filter cake was washed with acetone and subsequently air-dried to constant weight. The polymer had a specific viscosity of 0.470 (determined on an 0.5 solution of the polymer in 90 percent formic acid at 25° C.).

3.5 grams of o-monochlorophenol were mixed with 1.5 grams of the polypyrrolidone so prepared. The mixture was stirred with heating. The polymer was dissolved at 120° C. to form a clear viscous solution. The solution was stable at room temperature and suitable for forming a thick coating or a heavy film.

*Example II*

9 grams of o-chlorophenol were mixed with 1 gram of the polypyrrolidone prepared in accordance with the procedure in Example I. The mixture was stirred and the polymer went into solution at 25° C. The solution was suitable for casting film and drawing of fibers. The solution remained stable at room temperature.

*Example III*

To a 150 gram sample of essentially anhydrous pyrrolidone, there was added under a nitrogen atmosphere sodium hydride catalyst in a ratio of 1:100 parts catalyst to monomer by weight. When the evolution of hydrogen gas was completed, this mixture was stoppered to protect it against the atmosphere and permitted to stand 5 days at about 25° C. The polymer was recovered by breaking up the cake, grinding it in a Wiley mill, and washing the powder, first with water, then with acetone, in a Waring Blendor. The polymer was subsequently air-dried to constant weight. The polymer had a specific viscosity of 0.489 (determined on 0.5 percent solutions of the polymer in 90 percent formic acid at 25° C.).

2 grams of 2,4,6-trichlorophenol were mixed with 0.5 gram of the polypyrrolidone prepared above. The mixture was heated to a temperature of 140° C. with stirring. A slightly viscous dope was obtained. The polypyrrolidone began to precipitate out of the solvent at about 120° C. The solution formed was suitable for casting films and making fibers.

*Example IV*

9.5 grams of 2,4,6-trichlorophenol were mixed with 0.5 gram of polypyrrolidone prepared in accordance with the procedure set out in Example III. The mixture was heated with stirring to a temperature of about 85° C. where the polymer went into solution. The solution formed was clear, viscous and suitable for making a thin coating or a lacquer. Upon cooling to 65° C., the solution remained stable.

*Example V*

4 grams of 2,6-dichlorophenol were mixed with 12 grams of polypyrrolidone prepared in accordance with the procedure in Example III except that the polymer was permitted to stand for 2 days and had a specific viscosity of 0.914 (determined on 0.5 percent solutions of polymer in 90 percent formic acid at 25° C.). The mixture was heated with stirring to a temperature of about 130° C. where the polymer dissolved. The solution formed was clear, viscous and suitable for the casting of film and drawing of fibers. On cooling, the polymer precipitated out of the solvent at about 70° C.

Polypyrrolidone prepared with other catalysts and activators and having varying viscosity values gave like results when dissolved in the new solvents of this invention.

The new compositions of this invention present many advantages. For example, solutions of polypyrrolidone may be easily prepared on existing equipment without detailed elaborate procedures. The chlorinated phenol solvents of this invention are inexpensive and readily available. Furthermore, the new solvents of this invention may be employed without elaborate safety precautions. Polymeric solutions made with the new solvents of this invention are clear and colorless, and products or shaped articles prepared from such solutions exhibit good color characteristics. In addition to these advantages, the solvents of this invention are further advantageous in that they have no effect upon the desirable chemical and physical properties of the polymer dissolved therein. Numerous other advantages of the new compositions of this invention will be readily apparent to those skilled in the art.

It will be understood to those skilled in the art that many apparently widely different embodiments of this invention can be made without departing from the spirit and scope thereof. Accordingly, it is to be understood that this invention is not to be limited to the specific embodiments thereof except as defined in the appended claims.

I claim:

1. A new composition of matter consisting of polypyrrolidone and a solvent selected from the group consisting of mono-, di-, and trichlorinated phenols.

2. A new composition of matter as defined in claim 1 wherein the solvent is 2,4,6-trichlorophenol.

3. A new composition of matter as defined in claim 1 wherein the solvent is 2,6-dichlorophenol.

4. A new composition of matter as defined in claim 1 wherein the solvent is o-monochlorophenol.

5. A new composition of matter as defined in claim 1 wherein the solvent is 2,3-dichlorophenol.

6. A new composition of matter as defined in claim 1 wherein the solvent is 2,3,5-trichlorophenol.

7. A new composition of matter consisting of 5 to 35 percent based on the total weight of the composition, of polypyrrolidone and a solvent selected from the group consisting of mono-, di-, and trichlorinated phenols.

8. A new fiber-forming composition of matter consisting of 15 to 30 percent, based on the total weight of the composition, of polypyrrolidone, having a specific viscosity of at least 0.3, and a solvent selected from the group consisting of mono-, di-, and trichlorinated phenols.

9. A process for preparing a new composition of matter consisting of mixing polypyrrolidone and a solvent selected from the group consisting of mono-, di-, and trichlorinated phenols, and heating the mixture to a temperature in a range of 5° C. to the boiling point of the mixture to form a homogeneous solution.

10. The process as defined in claim 9 wherein the solvent is 2,4,6-trichlorophenol.

11. The process as defined in claim 9 wherein the solvent is 2,6-dichlorophenol.

12. The process as defined in claim 9 wherein the solvent is o-monochlorophenol.

13. The process as defined in claim 9 wherein the solvent is 2,3-dichlorophenol.

14. The process as defined in claim 9 wherein the solvent is 2,3,5-trichlorophenol.

15. A process for preparing a new composition of matter consisting of mixing 5 to 35 percent, based on the total weight of the composition, of polypyrrolidone and a solvent selected from the group consisting of mono-, di-, and trichlorinated phenols, and heating the mixture to a temperature in a range of 5° C. to the boiling point of the mixture to form a homogeneous solution.

16. A process for preparing a new fiber-forming composition of matter consisting of mixing 15 to 30 percent, based on the total weight of the composition, of polypyrrolidone, having a specific viscosity of at least 0.3, and a solvent selected from the group consisting of mono-, di-, and trichlorinated phenols, and heating the mixture to a temperature in a range of 5° C. to the boiling point of the mixture to form a homogeneous solution.

17. A process for preparing a new fiber-forming composition of matter consisting of mixing 25 percent, based on the total weight of the composition, of polypyrrolidone, having a specific viscosity of 0.489, and 2,4,6-trichlorophenol, and heating the mixture to a temperature of 140° C. to form a homogeneous solution.

References Cited in the file of this patent

UNITED STATES PATENTS

| | | |
|---|---|---|
| 2,214,402 | Carothers | Sept. 10, 1940 |
| 2,638,463 | Ney et al. | May 12, 1953 |
| 2,775,570 | Barkdoll et al. | Dec. 25, 1956 |
| 2,891,038 | Barnes et al. | June 16, 1959 |
| 2,927,906 | Schlack | Mar. 8, 1960 |